(12) United States Patent
Yamada et al.

(10) Patent No.: US 7,755,816 B2
(45) Date of Patent: Jul. 13, 2010

(54) SEMICONDUCTOR DEVICE CAPABLE OF PREVENTING ERRONEOUS OPERATION ATTRIBUTED TO ELECTROSTATIC NOISE, AND INPUT DEVICE AND SCANNER CAPABLE OF PREVENTING ELECTROSTATIC NOISE

(75) Inventors: Nobuyuki Yamada, Kyoto (JP);
Toshimitsu Tamagawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1145 days.

(21) Appl. No.: 11/388,583

(22) Filed: Mar. 23, 2006

(65) Prior Publication Data
US 2006/0226886 A1 Oct. 12, 2006

(30) Foreign Application Priority Data
Mar. 24, 2005 (JP) ............................. 2005-086745

(51) Int. Cl.
*H04N 1/46* (2006.01)
(52) U.S. Cl. ..................... 358/514; 358/482; 358/474; 358/443; 348/308; 348/294; 348/304; 327/365
(58) Field of Classification Search ................ 358/474, 358/482, 483, 302, 505, 443, 445, 512–514, 358/1.9, 409, 410; 250/214, 216, 294; 257/355, 257/461, E27.33; 348/E5.091, 308, 243, 348/294, 304; 327/365
See application file for complete search history.

(56) References Cited

U.S. PATENT DOCUMENTS

| | | | | |
|---|---|---|---|---|
| 4,352,128 A | * | 9/1982 | Ohori et al. ................ | 358/482 |
| 4,734,787 A | * | 3/1988 | Hayashi ...................... | 358/409 |
| 5,416,611 A | * | 5/1995 | Tandon ........................ | 358/474 |
| 5,600,369 A | * | 2/1997 | Cazaux et al. ............ | 348/218.1 |
| 5,650,622 A | * | 7/1997 | Ookawa et al. ............. | 250/332 |
| 7,095,004 B2 | * | 8/2006 | Tsou et al. ................ | 250/208.1 |
| 7,230,649 B2 | * | 6/2007 | Takahashi et al. ........... | 348/372 |
| 7,317,562 B2 | * | 1/2008 | Sawada ........................ | 358/509 |
| 7,362,479 B2 | * | 4/2008 | Ikeno .......................... | 358/482 |
| 7,394,579 B2 | * | 7/2008 | Takahashi ................... | 358/483 |
| 7,538,709 B2 | * | 5/2009 | Muramatsu et al. ......... | 341/161 |
| 2001/0017659 A1 | * | 8/2001 | Suzuki ........................ | 348/312 |
| 2003/0107659 A1 | * | 6/2003 | Takahashi et al. ......... | 348/222.1 |

FOREIGN PATENT DOCUMENTS

JP 2001-045377 2/2001

\* cited by examiner

*Primary Examiner*—Negussie Worku
(74) *Attorney, Agent, or Firm*—Fish & Richardson P.C.

(57) ABSTRACT

A semiconductor device includes: a plurality of external signal input means; an external input unit having a switch each connected between the external signal input means and a read line and electrically connected for output from the external signal input means on the read line; a shift register receiving an external control signal and an external clock signal and synchronized with the external clock signal to shift successively the external control signal to provide shifted data and output the external control signal to electrically connect the switches in accordance with the shifted data; an output circuit receiving the external control signal from the shift register and externally outputting the external control signal; and a frequency divider circuit dividing the external clock signal in frequency to generate and output an internal clock signal, wherein the output circuit is synchronized with the internal clock signal to externally output the external control signal.

9 Claims, 7 Drawing Sheets

NOISE ABSENT

PRIOR ART

NOISE ABSENT

FIG.12 PRIOR ART

NOISE PRESENT

SEMICONDUCTOR DEVICE CAPABLE OF PREVENTING ERRONEOUS OPERATION ATTRIBUTED TO ELECTROSTATIC NOISE, AND INPUT DEVICE AND SCANNER CAPABLE OF PREVENTING ELECTROSTATIC NOISE

BACKGROUND OF THE INVENTION

1. Field of the Invention

The present invention relates generally to cascaded semiconductor devices, and particularly to semiconductor devices and input devices employing the same characterized in that adjacent integrated circuits (ICs) employ an internal clock obtained by processing a clock employed as a signal timing an external parallel input to enhance resistance to electrostatic noise and the like.

2. Description of the Background Art

Figure 9:
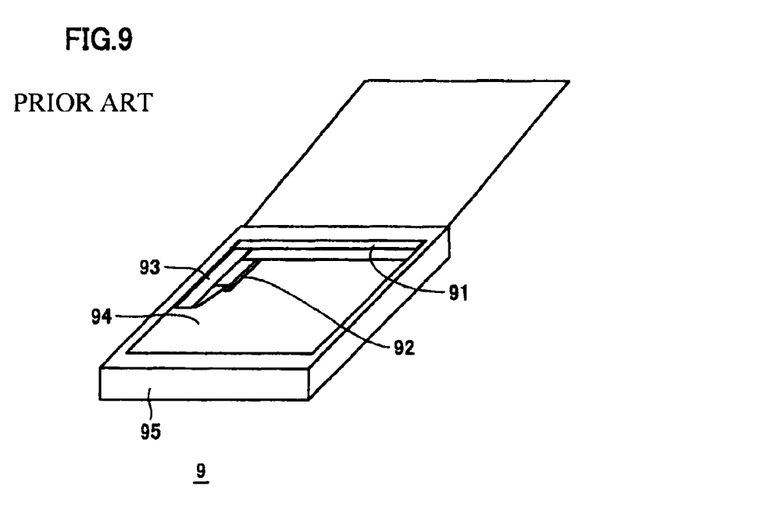
FIG. 9 schematically shows a flat bed scanner.

A scanner reading a variety of types of image data, for example as shown in FIG. 9, has a glass plate 94 securing an original thereon, and moves an image sensor unit 91 illuminating the original with light while reading an image. A flat bed scanner 9 includes an image sensor unit 91 reading an image, a controller 92 receiving a signal from image sensor unit 91 and processing and outputting the signal for example to a computer, a flexible cable 93 connecting controller 92 and image sensor unit 91 together, a glass plate 94 disposed at an upper surface of image sensor unit 91, and a casing 95, and is constantly required to provide an input image with high precision, read an image faster, and the like.

Figure 10:
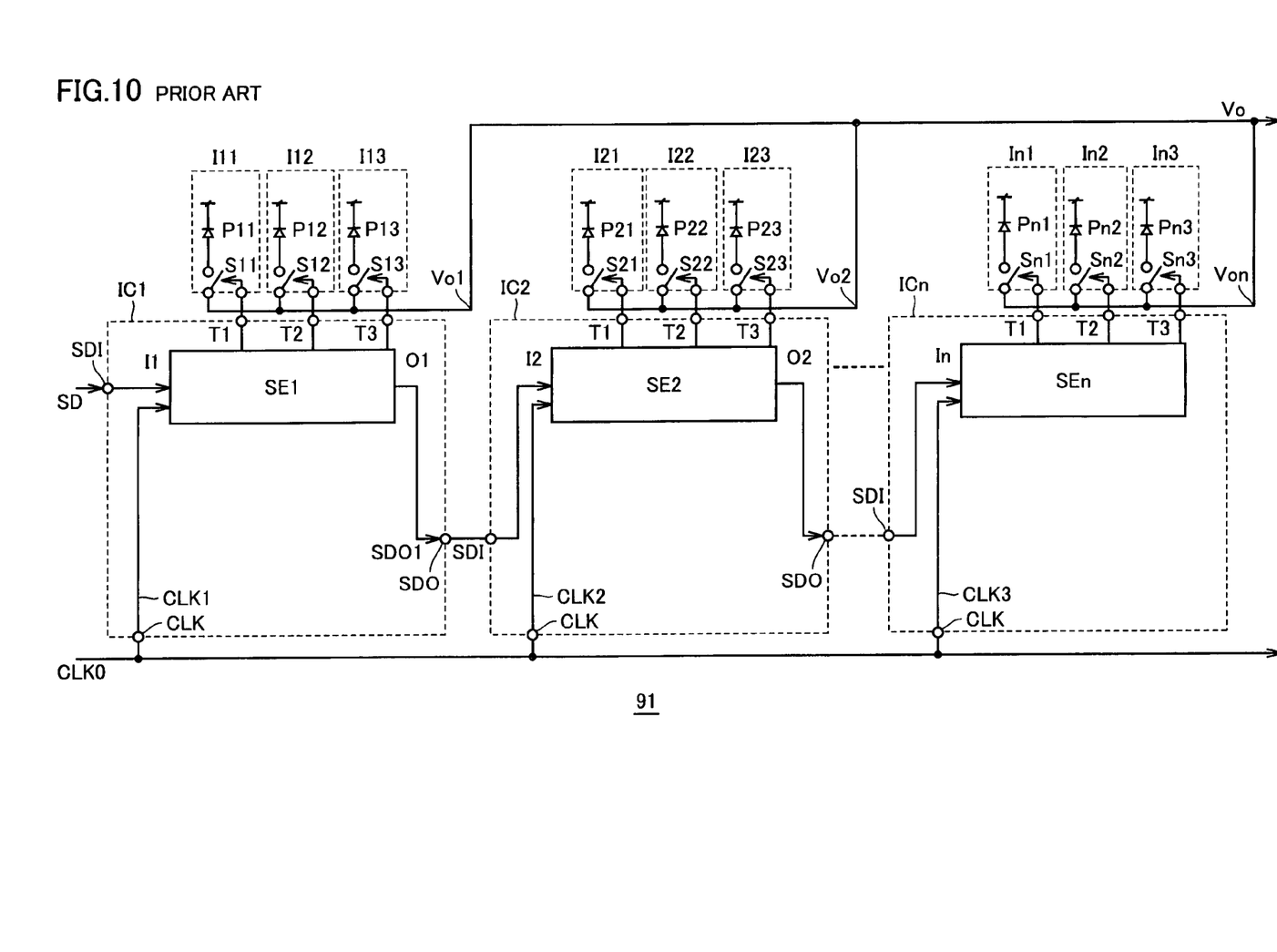
FIG. 10 specifically illustrates a conventional image sensor unit.

FIG. 10 shows a circuit configuration of a conventional input device.

Input device 91, as shown in FIG. 10, has a plurality of semiconductor devices IC1, IC2, . . . ICn (hereinafter also simply referred to as "IC") with adjacent external control signal output and input terminals SDO and SDI, respectively, mutually, electrically cascaded and arranged in a longitudinal direction. Furthermore, the semiconductor device has, as seen in IC1, a plurality of external input units I11, I12, . . . I1m connected thereto, wherein m is an integer larger than 1. Each semiconductor device receives an external clock signal CLK0.

The image sensor unit has shift register-incorporated, functionally identical ICs cascaded and in response to a clock signal CLK0 or a logically inverted version thereof outputs a shifted pulse from each shift register SE successively to a photoelectric converter's switches S11-Sn3 to read data for successive output on a line Vo to prevent data collision, for example as indicated in Japanese Patent Laying-Open No. 2001-045377.

Figure 11:
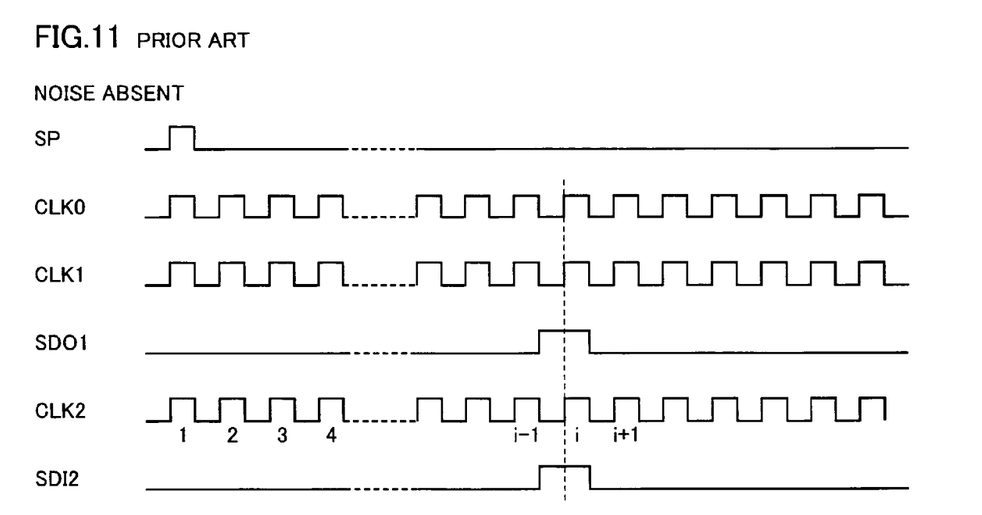
FIG. 11 illustrates a transfer provided when noise of data is absent for conventional semiconductor devices IC1 and IC2.

For example FIG. 11 represents a signal between IC1 and IC2, as conventional, when there is no noise. When such signal is input to the FIG. 10 circuit, the circuit operates as described hereinafter. A start signal SP is input to a terminal SD and a prescribed period of time thereafter elapses when the signal falls an external output signal SDO1 transitions high and is transmitted for semiconductor device IC2 as an external input signal SDI2 to a subsequent stage or semiconductor device IC2. Semiconductor device IC2 recognizes the high-level when the device's clock, or a clock signal CLK2, pulses for an ith time, and the data will be transferred to the subsequent IC correctly. Furthermore, a subsequent IC3 similarly transfers data.

When a scanner reading an image or a vicinity of a scanner doing so is touched by a person the human body can discharge static electricity. The pulsed electrostatic noise causes an error in taking in data and the taken image may have a lateral line therein and hence poor quality.

Figure 12:
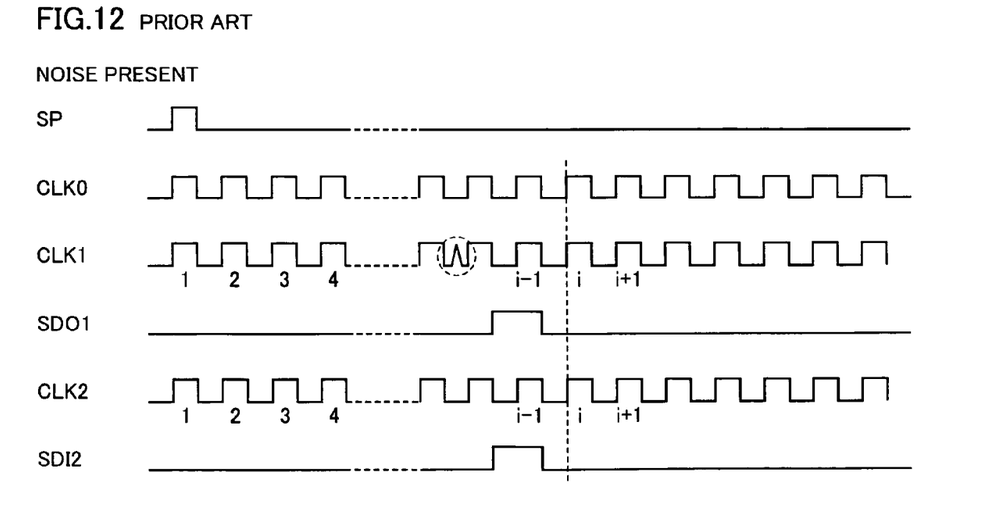
FIG. 12 illustrates a transfer provided when noise of data is present for conventional semiconductor devices IC1 and IC2.

An operation provided when a clock receives noise (as indicated in FIG. 12 by a circle) will be described.

Start signal SP is input to terminal SD and thereafter before the prescribed period of time elapses the semiconductor device IC1 external clock signal CLK0 receives noise for the sake of illustration. Thereafter before the prescribed period of time ends, or when external clock signal CLK0 pulses for an (i−2)th time, external output signal SDO1 transitions from low to high and when external clock signal CLK0 pulses for an (i−1)th time external output signal SDO1 transitions from high to low and is transmitted for semiconductor device IC2 as external input signal SDI2 to the subsequent semiconductor device IC2. Semiconductor device IC2 attempts to take in the signal when an external clock signal similar to that for semiconductor device IC1, or external clock signal CLK0, pulses for the ith time. However, external input signal SDI2 has transitioned low, and data will not be transferred to the subsequent IC correctly. As such, if as shown in FIG. 12 static electricity is discharged or the like and accordingly a pulsed noise is input to the clock and data is taken in erroneously, the obtained image may have a lateral line therein resulting in poor image quality.

In particular, for a flat bed scanner, as shown in FIG. 9, the flexible cable transmitting and receiving data serves as an antenna picking up electrostatic noise. As a result, noise is readily introduced.

In general, electrostatic noise is prevented by mixing an electrically conductive substance into a glass plate that bears an image thereon to be read, applying a metal shield on a glass plate, or the like. Reading an image, however, essentially entails that external signal receiving means has a colorless and transparent top portion or that there is a colorless and transparent portion thereabove. As such, it has been difficult to employ means preventing electrostatic noise.

Furthermore an analog filter may be inserted from an input terminal of an IC employed for the image sensor unit and may be disposed between internal logic units to provide increased resistance to noise. However, a clock signal line, in contrast to other signal lines, is synchronized with a main body. Accordingly it is not preferable to insert an analog filter, as done for other signals.

SUMMARY OF THE INVENTION

The present invention provides a semiconductor device that can eliminate the necessity of inserting an analog filter at clock signal line of a plurality of cascaded ICs to prevent an erroneous operation attributed to electrostatic noise, and an input device equipped therewith.

The present invention provides a semiconductor device including:

a plurality of external signal input means;

an external input unit having a switch each connected between the external signal input means and a read line and electrically connected for output from the external signal input means on the read line;

a shift register receiving an external control signal and an external clock signal and synchronized with the external clock signal to shift successively the external control signal to provide shifted data and output the external control signal to electrically connect the switch in accordance with the shifted data;

an output circuit receiving the external control signal from the shift register and externally outputting the external control signal; and a frequency divider circuit dividing the external clock signal in frequency to generate and output an internal clock signal, wherein the output circuit is synchronized with the internal clock signal to externally output the external control signal.

The present invention in another aspect provides a semiconductor device including:

a plurality of external signal input means;

an external input unit having a switch each connected between the external signal input means and a read line and electrically connected for output from the external signal input means one the read line;

a shift register receiving an external control signal and an external clock signal and synchronized with the external clock signal to shift successively the external control signal to provide shifted data and output the external control signal to electrically connect the switch in accordance with the shifted data;

an input circuit inputting the external control signal from an external input control signal input terminal to the shift register; and a frequency divider circuit dividing the external clock signal in frequency to generate and output an internal clock signal, wherein the input circuit is synchronized with the internal clock signal to output the external control signal to the shift register.

The present invention in still another aspect provides a semiconductor device including:

a plurality of external signal input means;

an external input unit having a switch each connected between the external signal input means and a read line and electrically connected for output from the external signal input means one the read line;

a shift register receiving an external control signal and an external clock signal and synchronized with the external clock signal to shift successively the external control signal to provide shifted data and output the external control signal to electrically connect the switch in accordance with the shifted data;

an input circuit inputting the external control signal from an external input control signal input terminal to the shift register;

an output circuit receiving the external control signal from the shift register for external output;

a first frequency divider circuit dividing the external clock signal in frequency to generate and output a first internal clock signal; and a second frequency divider circuit dividing the external clock signal in frequency to generate and output a second internal clock signal; wherein the input circuit is synchronized with the first internal clock signal to internally input the external control signal and the output circuit is synchronized with the second internal clock signal to externally output the external control signal.

Furthermore the present invention provides an input device including N semiconductor devices, N being an integer of at least two, and adjacent ones of the semiconductor devices have output and input circuits cascaded to be mutually connected, and a semiconductor device described in the first or third embodiment serves as a first semiconductor device, that described in the third embodiment serves as a second to (N−1)th semiconductor device and that described in the second or third embodiment serves as an Nth semiconductor device, characterized in that a signal based on a clock signal output from the first or second frequency divider circuit is communicated between the semiconductor devices.

Furthermore for the input device that has a rectangular geometry, such as an image sensor, the N semiconductor devices are arranged along a longer side of the rectangular geometry.

Furthermore for the input device the external signal input means is implemented by a C-MOS image sensor, a photodiode, a phototransistor or a similar photoelectric conversion device providing an output on the read line.

Furthermore for the input device the external input means has an upper portion provided with or underlies a glass or similarly insulative, transparent body provided on an image sensor.

The present invention is a flat bed scanner characterized by employing an input device employing the semiconductor device described above.

If the present semiconductor device receives electrostatic noise or a similarly pulsed noise, it can reduce a lateral line caused in an image that is attributed to erroneously reading data. Furthermore, if electrostatic noise is superimposed directly on an IC chip that is not molded as done for a typical chip, (also referred to as a bare chip), the possibility of erroneous operation can be reduced. Furthermore not only internal to the semiconductor device but also on a clock line transmitting a clock signal serving as a reference for generating data communicated between a plurality of cascaded semiconductor devices or with another semiconductor device (e.g., a CPU (a central processing layer) mounted in controller 2) controlling a semiconductor device of interest a delay attributed for example to a time constant is not introduced and reliable data communication can thus be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

When a plurality of semiconductor devices are cascaded and electrostatic noise is applied, a preceding semiconductor device can nonetheless timely output a signal and a subsequent semiconductor device can also timely receive the signal.

First Embodiment

Figure 1:
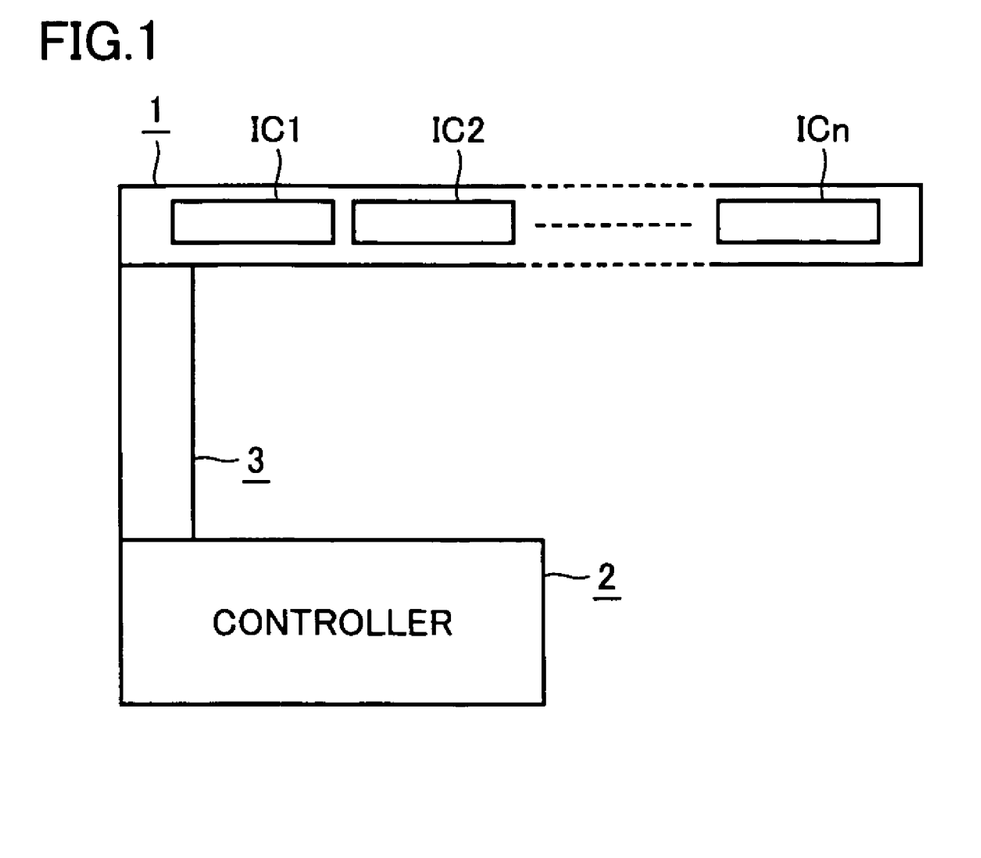
FIG. 1 illustrates how an image sensor and an controller that employ the present invention are connected.

FIG. 1 shows a configuration of an input device in one embodiment having the present semiconductor device applied thereto.

With reference to FIG. 1, the present embodiment provides semiconductor devices IC1, IC2 . . . ICn disposed along a longer side of a rectangular input device 1 (corresponding in FIG. 9 to image sensor unit 91). Input device 1 is connected by a flexible cable 3 (corresponding in FIG. 9 to flexible cable 93) to a controller 2 (corresponding in FIG. 9 to controller 92). Note that through flexible cable 3 from input device 1 an input signal is input to controller 2, and from controller 2 through flexible cable 3 input device 1 receives a clock signal, a mode switching signal and other similar control signals.

Figure 2:
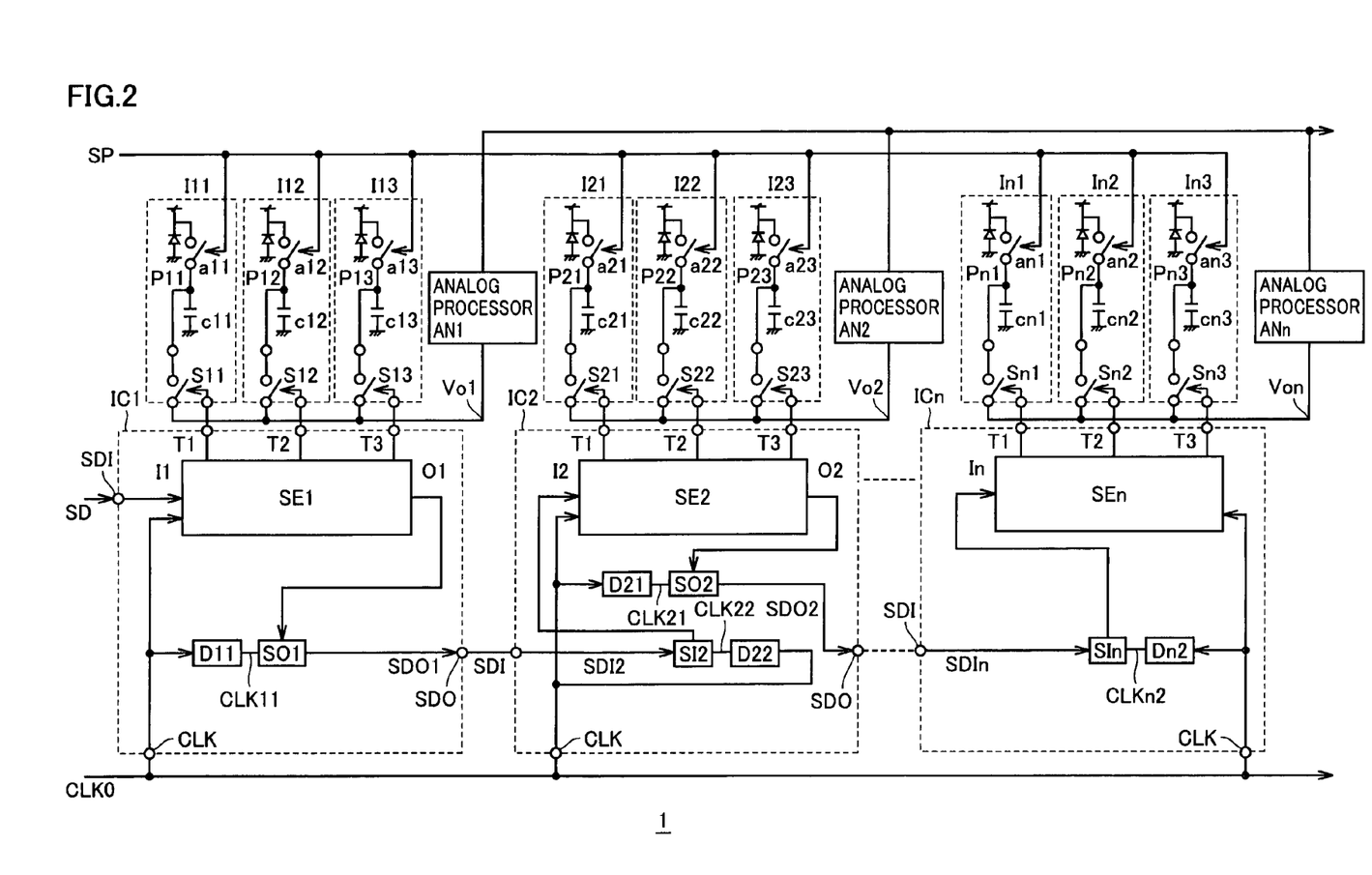
FIG. 2 illustrates a circuit configuration of an image sensor unit of the present invention.

FIG. 2 shows a circuit configuration of input device 1.

With reference to FIG. 2, input device 1 has a plurality of semiconductor devices IC1, IC2, . . . , ICn with adjacent external control signal output and input terminals SDO and SDI, respectively, mutually, electrically cascaded and arranged in a longitudinal direction, as conventional. Furthermore, the semiconductor device has, as seen in IC1, a plurality of external input units I11, I12, . . . , I1m connected thereto, wherein m is an integer larger than 1. Each semiconductor device receives external clock signal CLK0. Note that the external input unit may be fabricated on the same substrate as the semiconductor device, or may be configured separately.

Each external input unit is identically configured. External input unit I11 will representatively be described.

External input unit I11 includes external signal input means P11, such as a photodiode externally receiving an optical signal or the like, a first switch a11 controlled by a start pulse signal SP to open and close, storage means c11 charged with a current by external signal input means P11, and a second switch S11 controlled by a signal output from a shift register SE, which will be described later, to open and close.

Each external input unit is controlled by semiconductor device IC1 as described hereinafter.

Semiconductor device IC1 has a clock terminal CLK receiving an external clock signal output from controller 2 and input to the present input device 1, an input terminal SDI receiving an external control signal serving as a reference for timing each external input unit's second switch to open and close, external output terminals T1, T2, T3 outputting a signal controlling each second switch to open and close, and an output terminal SDO outputting an external control signal to a subsequent semiconductor device.

Semiconductor conductor device IC1 includes a shift register SE1 receiving an external control signal SD and external clock signal CLK0 and synchronized with external clock signal CLK0 to shift the external control signal successively to output a shifted pulse to allow the external input unit to have the second switch conduct, an output circuit SO1 externally outputting the external control signal received from shift register SE1, and a frequency divider circuit D11 dividing external clock signal CLK0 in frequency to output an internal clock signal CLK1.

In contrast, semiconductor device ICn does not have output circuit SO1 externally outputting the external control signal received from shift register SE1, as provided in semiconductor device IC1. Instead, semiconductor device ICn includes an input circuit SIn inputting the external control signal from input terminal SDI to shift register SEn, and a frequency divider circuit Dn2 dividing external clock signal CLK0 in frequency to output an internal clock signal CLKn2.

Furthermore, semiconductor devices IC2 to ICn−1 have together output and input circuits SO and SI, respectively, provided to semiconductors IC1 and ICn and are provided with a plurality of frequency divider circuits D21, D22 generating an internal clock signal controlling the output and input circuits. Note that it is not necessary to provide a plurality of frequency divider circuits. A single frequency divider circuit may be used. This can provide a circuit having a size smaller than that provided with a plurality of frequency divider circuits, and hence a miniaturized chip.

Figure 3:
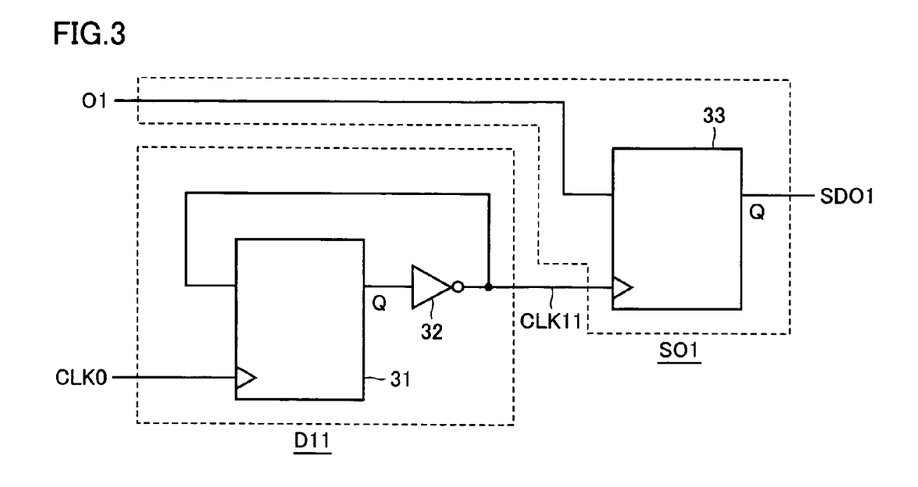
FIG. 3 illustrates a frequency divider circuit and output circuit employed for the image sensor unit of the present invention.

Frequency divider circuit D11 includes a D flip flop 31, and an inverter 32 receiving a non-inverted version Q of an output provided from D flip-flop 31, as shown in FIG. 3. External clock signal CLK0 and an inverted version of the non-inverted version Q are input to D flip flop 31. D flip flop 31 outputs the non-inverted version Q which is in turn input to inverter 32 which in turn outputs an external clock signal divided by two in frequency, i.e., an internal clock signal CLK11.

Output circuit SO1 is provided with a D flip flop 33, which receives a signal output from shift register SE1, and outputs signal SDO1 as internal clock signal CLK11 received rises.

Note that semiconductor devices IC2, . . . ICn are similarly configured and the remaining semiconductor device IC have output circuit SO and the corresponding frequency divider circuit in a configuration similar to that of FIG. 3. Furthermore, input circuits SI2, . . . SIn also have a configuration similar to that of output circuit SO1, and hold and output data as the corresponding frequency divider circuits D22, . . . Dn2 have internal clock signal CLK22, . . . , CLKn2 rising. The frequency divider circuit corresponding to input circuit SI is provided with an inverter generating an inverted version of external clock signal CLK, although not shown, and the inverted version of the clock signal is input to the frequency divider circuit.

The embodiment will be described in a case in which noise occurs once for the sake of illustration. It should be noted, however, that noise occurring more than once can be handled by series connecting a number of frequency divider circuits D11 depending on how often electrostatic noise occurs. In accordance with the number L external output signal SDO1 has a high period T represented by T×2×L, and if the clock becomes faster by the number of occurrences of noise, a subsequent stage will nonetheless receive timely i, and image data as a whole can be prevented from being offset.

Figure 4:
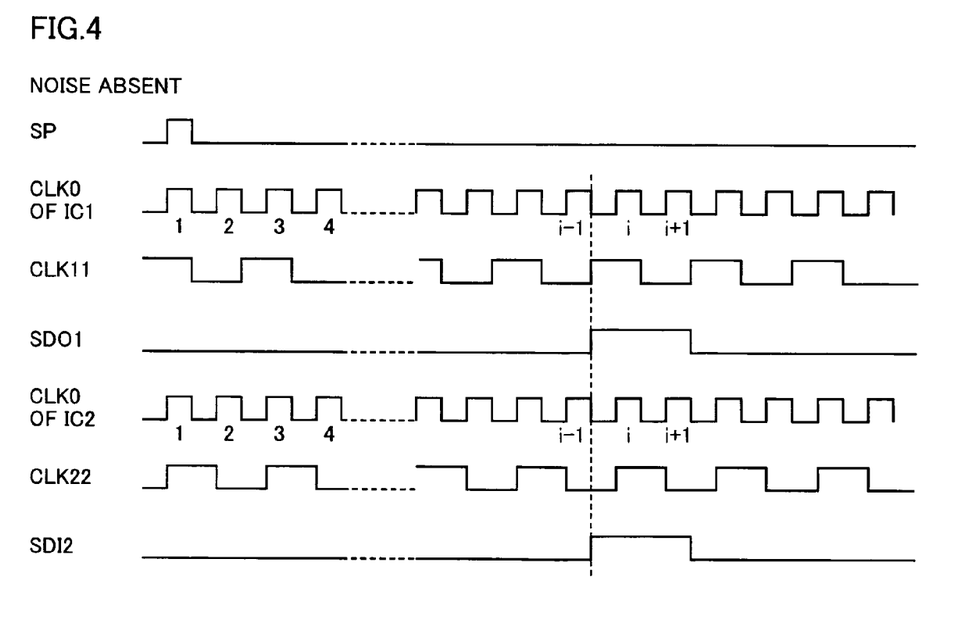
FIG. 4 illustrates a transfer provided when noise of data is absent for semiconductor devices IC1 and IC2 of the present invention.

With reference to FIG. 4, an operation provided when a clock signal between semiconductor devices IC1 and IC2 does not have noise, will be described.

Initially, start pulse signal SP transitions. Switches a11 through an3 conduct, all at once, and storage means (or capacitors) c11-cn3 store electric charge corresponding to destination for input. Thereafter a prescribed period of time elapses when external clock signal CLK0 falls for the (i−1)th time external output signal SDO1 transitions high and when external clock signal CLK0 falls for an (i+1)th time external output signal SDO1 transitions low. External output signal SDO1 is transmitted for IC2 as external input signal SDI2 to IC2. Subsequently when external clock signal CLK0 rises for the ith time, IC2 recognizes the high level at the IC2 internal clock signal, or CLK22, and data will be transferred to the subsequent IC correctly. Furthermore for the subsequent IC3 also data is similarly transferred.

Figure 5:
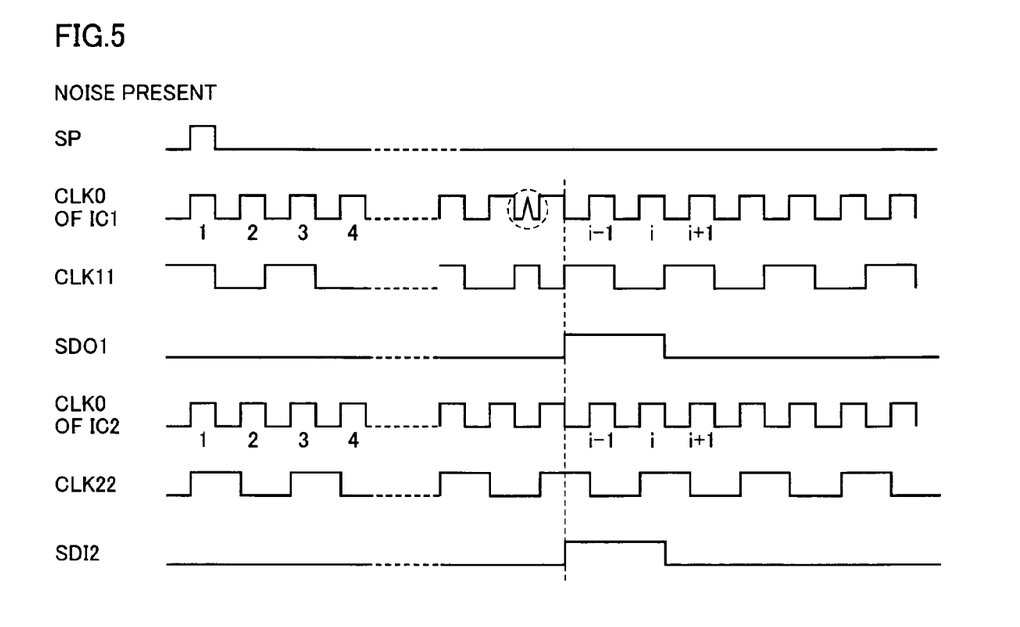
FIG. 5 illustrates a transfer provided when noise of data is present for semiconductor devices IC1 and IC2 of the present invention.

FIG. 5 illustrates an operation provided when there is noise and between semiconductor devices IC1 and IC2 a clock signal has noise.

Similarly as described in FIG. 4, initially start pulse SP transitions. Switches a11 through an3 conduct, all at once, and storage means (or capacitors) c11-cn3 store electric charge. At a time earlier than a prescribed time the IC1 external clock signal CLK0 has noise (indicated in FIG. 5 by a circle) introduced therein for the sake of illustration.

As prescribed, external output signal SDO1 should transitions from low to high when external clock signal CLK0 falls for an (i−1)th time. In reality, however, external output signal SDO1 does so earlier than that, or when external clock signal CLK0 falls for an (i−2)th time. External output signal SDO1 is transmitted for IC2 as external input signal SDI2 to IC2. Subsequently when the external clock signal rises for the ith time, IC2 recognizes the high level in synchronization with the IC2 internal clock signal CLK22, and data will be transferred to the subsequent IC correctly. As such, if a preceding IC's external clock has electrostatic noise introduced therein, image data as a whole can be prevented from being offset, as is with a conventional input device.

Note that the prescribed period of time can be determined by multiplying a time at which an external input unit takes in data by the number of flip-flops configuring a shift register. Furthermore, a time at which an analog signal processor AN1 of the IC of interest is activated may be considered and the external input unit's process time multiplied by the number of flip-flops configuring the shift register minus the analog processor's activation time may be set as the prescribed period of time. Such setting allows each IC to have the analog processor timely activated. It is not necessary to activate an analog processor of an IC that is not selected, and the input device of interest can consume a reduced amount of power. Note that analog signal processor AN1 may be activated by external output signal SDO1.

Figure 6:
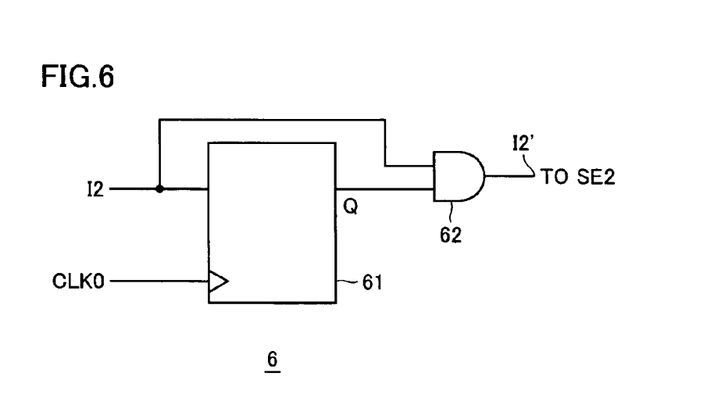
FIG. 6 shows a one fashion of an input data reproduction circuit of the present invention.

Furthermore if an input data reproduction circuit 6 shown in FIG. 6 is provided between input circuit SI2 and shift register SE2, a shift register identical to a conventional shift register portion can be used.

For example, input data reproduction circuit 6 shown in FIG. 6 includes a D flip flop 61 receiving external clock signal CLK0 and input data I2, and outputting data Q corresponding to input data I2 delayed by one clock of external clock signal CLK0, and AND circuit 62 receiving input data I2 and data Q, and may have any configuration that allows a similar operation.

Figure 7:
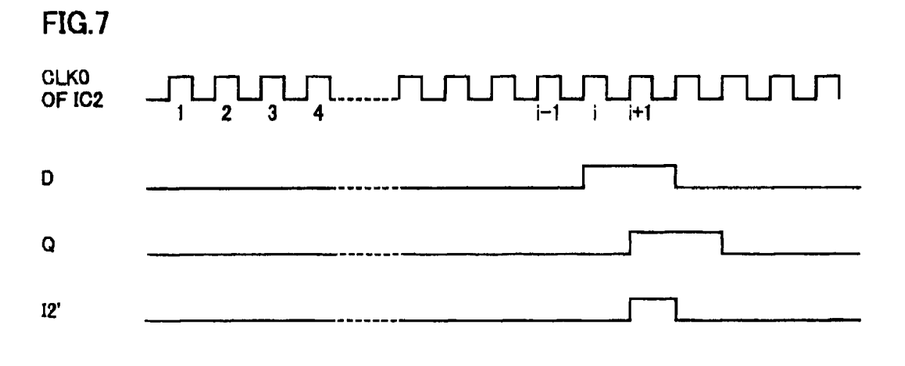
FIG. 7 illustrates how the present invention's input data reproduction circuit transfers data.

FIG. 7 illustrates the operation. Note that the description is provided with a reference character of IC2 used, it is also applied to ICn having an input circuit. If IC1 has a plurality of frequency divider circuits D11, a plurality of input data reproduction circuits 6 may be provided.

While in FIG. 2 IC1, ICn, and IC2 are implemented by ICs of the first, second and third embodiments, respectively, they may all be replaced with those of the third embodiment. Although this results in introducing output and input circuits unnecessary in FIG. 2 and hence a large circuit. When production cost is considered, however, it is desirable to replace all with the third embodiment.

The present semiconductor device exhibits large resistance to noise input to a clock signal. As such, it is most suitably used as a data input of a scanner for which it is difficult to take conventional approach against static electricity. In contrast to typical semiconductor devices, a semiconductor device of an image sensor employed in a scanner has a characteristic that conventionally prevents plastic-molding the semiconductor device. In addition, it cannot be provided at an upper portion thereof or therearound with means for dissipating static electricity and is thus susceptible to external electrostatic noise. The present semiconductor device can be designed without significantly considering such factors, and is thus suitable for a scanner and the like.

If connection is provided like an antenna, i.e., the semiconductor device is arranged over a large length, as provided for an image sensor, for each semiconductor device a frequency divider circuit can be used an internal clock can be used to provide synchronization, and a subsequent semiconductor device's erroneous data transmission attributed to noise can be reduced.

The description has been made with the FIG. 9 flat bed scanner as an example, it is also applicable to a sheet feed scanner employed as an image input device such as facsimile or a similar communication device.

Figure 8:
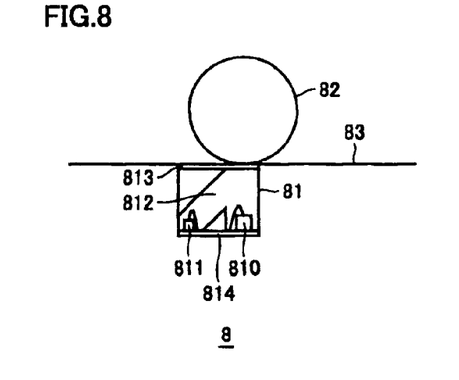
FIG. 8 is a cross section of a sheet feed scanner.

A sheet feed scanner includes an image sensor unit 81, and a platen 82 moving an original 83, as shown in FIG. 8.

Image sensor unit 81 includes an input device 810 receiving a read image, a light source 811 emitting light to illuminate the original, a light guiding unit 812 guiding the light efficiently to the original, a glass unit 813 contacting original 83, and a substrate 814 bearing input device 810 and light source 811.

While in contrast to image sensor unit 91 of flat bed scanner 9 image sensor unit 81 of sheet feed scanner 8 hardly receives static electricity for example from human body, to read an original platen 82 and image sensor unit 81 cooperate to sandwich original 83 and platen 82 is rotated to move original 83. As original 83 is an insulator, between image sensor 81, platen 82 and original 83 as the original moves static electricity is generated charges a vicinity thereof.

As well as for the flat bed scanner, in the vicinity of input device 810 light guiding unit 812 formed of transparent insulator is provided. As such, charged electricity cannot dissipate. The input device as described in the present invention exhibits large resistance to noise attributed to static electricity and is useful for the flat bed scanner and the sheet feed scanner. While the present description has been made for an image input device, it is also usefully applicable not only to such input devices but also when the present invention is applied to connect a group of cascaded shift registers and in a vicinity thereof electrostatic noise occurs.

The external input means that is implemented by a photoelectric conversion device can be a CMOS, a phototransistor, a photodiode or the like. In other words, it may be any fashion that allows photoelectric conversion and a switching operation and may be used in accordance with the application of interest.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor device comprising:
   a plurality of external signal input units;
   each external input unit having a switch connected between said external signal input unit and a read line and electrically connected for output from said external signal input unit on said read line;

a shift register arranged to receive an external control signal and an external clock signal and synchronized with said external clock signal to shift successively the external control signal to provide shifted data and arranged to electrically connect said switch in accordance with said shifted data;

an output circuit arranged to receive said external control signal from said shift register and to externally output said external control signal; and a frequency divider circuit arranged to divide said external clock signal in frequency to generate and output an internal clock signal, wherein said output circuit is synchronized with said internal clock signal to externally output said external control signal.

2. A semiconductor device comprising:

a plurality of external signal input units;

each external input unit having a switch connected between said external signal input unit and a read line and electrically connected for output from said external signal input unit on said read line;

a shift register arranged to receive an external control signal and an external clock signal and synchronized with said external clock signal to shift successively the external control signal to provide shifted data and arranged to electrically connect said switch in accordance with said shifted data;

an input circuit arranged to input said external control signal from an external input control signal input terminal to said shift register; and a frequency divider circuit arranged to divide said external clock signal in frequency to generate and output an internal clock signal, wherein said input circuit is synchronized with said internal clock signal to output said external control signal to said shift register.

3. A semiconductor device comprising:

a plurality of external signal input units;

each external input unit having a switch connected between said external signal input unit and a read line and electrically connected for output from said external signal input unit on said read line;

a shift register arranged to receive an external control signal and an external clock signal and synchronized with said external clock signal to shift successively the external control signal to provide shifted data and arranged to electrically connect said switch in accordance with said shifted data;

an input circuit arranged to input said external control signal from an external input control signal input terminal to said shift register;

an output circuit arranged to receive said external control signal from said shift register for external output;

a first frequency divider circuit arranged to divide said external clock signal in frequency to generate and output a first internal clock signal; and a second frequency divider circuit arranged to divide said external clock signal in frequency to generate and output a second internal clock signal; wherein said input circuit is synchronized with said first internal clock signal to internally input said external control signal and said output circuit is synchronized with said second internal clock signal to externally output said external control signal.

4. An input device including N semiconductor devices, N being an integer of at least two, adjacent ones of said semiconductor devices being cascaded, each of said semiconductor devices including:

a plurality of external signal input unit;

each external input unit having a switch connected between said external signal input unit and a read line and electrically connected for output from said external signal input unit on said read line;

a shift register arranged to receive an external control signal and an external clock signal and synchronized with said external clock signal to shift successively the external control signal to provide shifted data and arranged to electrically connect said switch in accordance with said shifted data;

at least one of an input circuit arranged to input said external control signal from an external input control signal input terminal to said shift register and an output circuit arranged to receive said external control signal from said shift register for external output; and at least one of first and second frequency divider circuits associated with said input and output circuit, respectively, said first frequency divider circuit arranged to divide said external clock signal in frequency to generate and output a first internal clock signal, said second frequency divider circuit arranged to divide said external clock signal in frequency to generate and output a second internal clock signal, wherein:

said input circuit is synchronized with said first internal clock signal to internally input said external control signal and said output circuit is synchronized with said second internal clock signal to externally output said external control signal; and in synchronization with said first and second internal clock signals, said external control signal is transmitted to a subsequent one of said semiconductor devices.

5. The input device according to claim 4, having a rectangular geometry, wherein said N semiconductor devices are arranged along a longer side of said rectangular geometry.

6. The input device according to claim 4, wherein each of said external signal input units includes a photoelectric conversion device providing an output on said read line.

7. The input device according to claim 4, wherein each of said external signal input units has an upper portion provided with or underlying an insulative transparent body.

8. A scanner comprising N semiconductor devices, N being an integer of at least two, adjacent ones of said semiconductor devices being cascaded, each said semiconductor device including:

a plurality of external signal input units;

each external input unit having a switch each connected between said external signal input unit and a read line and electrically connected for output from said external signal input unit on said read line;

a shift register arranged to receive an external control signal and an external clock signal and synchronized with said external clock signal to shift successively the external control signal to provide shifted data and arranged to electrically connect said switch in accordance with said shifted data;

at least one of an input circuit arranged to input said external control signal from an external input control signal input terminal to said shift register and an output circuit arranged to receive said external control signal from said shift register for external output; and at least one of first and second frequency divider circuits associated with said input and output circuit, respectively, said first frequency divider circuit arranged to divide said external clock signal in frequency to generate and output a first internal clock signal, said second frequency divider circuit arranged to divide said external clock signal in frequency to generate and output a second internal clock signal, wherein:

said input circuit is synchronized with said first internal clock signal to internally input said external control signal and said output circuit is synchronized with said second internal clock signal to externally output said external control signal; and in synchronization with said first and second internal clock signals said external control signal is transmitted to a subsequent one of said semiconductor devices.

9. The scanner according to claim 8 wherein the scanner is a flat bed scanner or a sheet feed scanner.

* * * * *